US012305521B1

(12) United States Patent
Pellerin

(10) Patent No.: US 12,305,521 B1
(45) Date of Patent: May 20, 2025

(54) RETAINING RING CENTRIFUGAL GROWTH LIMITER

(71) Applicant: Pratt & Whitney Canada Corp., Longueuil (CA)

(72) Inventor: Hugues Pellerin, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/809,856

(22) Filed: Aug. 20, 2024

(51) Int. Cl.
*F01D 25/16* (2006.01)

(52) U.S. Cl.
CPC ........ *F01D 25/162* (2013.01); *F05D 2240/50* (2013.01); *F05D 2240/70* (2013.01); *F05D 2260/30* (2013.01)

(58) Field of Classification Search
CPC .... F01D 25/162; F01D 5/026; F05D 2240/50; F05D 2260/30; F16B 21/183; F16C 2360/23
See application file for complete search history.

(56) References Cited

U.S. PATENT DOCUMENTS 7,540,501 B2 6/2009 Flaherty
7,704,029 B2 * 4/2010 Blais ....................... F16D 1/076 411/533
8,540,432 B2 9/2013 Marciquet et al.
9,574,610 B2 2/2017 Kice et al.
9,933,005 B2 4/2018 Kahl
11,226,008 B2 * 1/2022 Finke ....................... F01D 5/026
11,391,157 B1 * 7/2022 Pankratov ................. F01D 5/10
11,560,807 B2 1/2023 Rak
2013/0156589 A1 * 6/2013 Paquet .................. F01D 5/3023 29/889.21
2024/0167516 A1 5/2024 Yoneda et al.

* cited by examiner

*Primary Examiner* — Eldon T Brockman
(74) *Attorney, Agent, or Firm* — CANTOR COLBURN LLP

(57) ABSTRACT

A rotating component assembly of a gas turbine engine of an aircraft including a first rotating component, a second rotating component located at an external surface of the first rotating component, and a retention assembly configured to axially retain the second rotating component relative to the first rotating component. The retention assembly includes a cup installed to the first rotating component configured to axially abut the second rotating component and one or more external retaining rings installed to the first rotating component to axially retain the cup and the second rotating component. One or more washers are installed radially between the cup and the one or more external retaining rings, and one or more internal retaining rings installed to the cup to axially retain the one or more washers relative to the cup.

20 Claims, 8 Drawing Sheets

RETAINING RING CENTRIFUGAL GROWTH LIMITER

BACKGROUND

Exemplary embodiments pertain to the art of gas turbine engines for aircraft, and more particularly to rotating assemblies, such as bearing assemblies of gas turbine engines.

Axial retention features are utilized on rotating components to prevent self-disassembling of the rotating assembly if the primary retention feature, such as load induced friction, is partially lost during operation. Some typical configurations utilize a torqued nut as the axial retention feature, but such a configuration involves utilizing specific tools and torquing procedures which may be difficult and time consuming. It also requires a rotation limiter to lock the nut in position if it loosens.

Other configurations utilize a retaining ring, but such rings are split or open-ended which makes the ring compliant in the radial direction. This compliance makes installation and removal relatively easy, but subjects them to centrifugal growth when spun. It is desirable to create improved architectures.

BRIEF DESCRIPTION

In one exemplary embodiment, a rotating component assembly of a gas turbine engine of an aircraft including a first rotating component, a second rotating component located at an external surface of the first rotating component, and a retention assembly configured to axially retain the second rotating component relative to the first rotating component. The retention assembly includes a cup installed to the first rotating component configured to axially abut the second rotating component and one or more external retaining rings installed to the first rotating component to axially retain the cup and the second rotating component. One or more washers are installed radially between the cup and the one or more external retaining rings, and one or more internal retaining rings installed to the cup to axially retain the one or more washers relative to the cup.

Additionally or alternatively, in this or other embodiments the one or more external retaining rings are engaged in a first rotating component groove of the first rotating component.

Additionally or alternatively, in this or other embodiments the cup includes a cup base configured to axially abut the second rotating component, a cup body extending axially from the cup base, and a cup groove defined in the cup body. The one or more internal retaining rings are positioned in the cup groove.

Additionally or alternatively, in this or other embodiments one or more cup tabs extend radially inwardly from the cup base, and one or more component slots are defined in the first rotating component receptive of the one or more cup tabs.

Additionally or alternatively, in this or other embodiments a washer of the one or more washers includes a washer base installed to the first rotating component, and a washer body extending axially from the washer body to a position radially between an outer perimeter of the one or more external retaining rings and a radially inner surface of the cup defining a radial clearance between the washer body and the one or more external retaining rings.

Additionally or alternatively, in this or other embodiments the clearance is defined to prevent disengagement of the one or more external retaining rings from the first rotating component.

Additionally or alternatively, in this or other embodiments the one or more washers is two washers.

Additionally or alternatively, in this or other embodiments a spring element is positioned axially between a first washer of the two washers and a second washer of the two washers.

In another exemplary embodiment, a shaft and bearing assembly of a gas turbine engine of an aircraft includes a rotating shaft, a bearing element installed to an external surface of the shaft, and a retention assembly installed to the shaft to axially retain the bearing element relative to the shaft. The retention assembly includes a cup installed to the shaft configured to axially abut the bearing element and one or more external retaining rings installed to the shaft to axially retain the cup and the bearing. One or more washers are installed radially between the cup and the one or more external retaining rings, and one or more internal retaining rings are installed to the cup to axially retain the one or more washers relative to the cup.

Additionally or alternatively, in this or other embodiments the one or more external retaining rings are engaged in a shaft groove of the shaft.

Additionally or alternatively, in this or other embodiments the cup includes a cup base configured to axially abut the bearing element, a cup body extending axially from the cup base, and a cup groove defined in the cup body. The one or more internal retaining rings are positioned in the cup groove.

Additionally or alternatively, in this or other embodiments one or more cup tabs extend radially inwardly from the cup base, and one or more component slots are defined in the shaft receptive of the one or more cup tabs.

Additionally or alternatively, in this or other embodiments a washer of the one or more washers includes a washer base installed to the shaft, and a washer body extending axially from the washer body to a position radially between an outer perimeter of the one or more external retaining rings and a radially inner surface of the cup defining a radial clearance between the washer body and the one or more external retaining rings.

Additionally or alternatively, in this or other embodiments the clearance is defined to prevent disengagement of the one or more external retaining rings from the shaft.

Additionally or alternatively, in this or other embodiments the one or more washers is two washers.

Additionally or alternatively, in this or other embodiments a spring element is positioned axially between a first washer of the two washers and a second washer of the two washers.

In yet another exemplary embodiment, a gas turbine engine of an aircraft includes a combustor, and a turbine driven about an engine central longitudinal by combustion products. A shaft driven is about the engine central longitudinal axis by the turbine, and a bearing element is positioned at the shaft. A retention assembly is installed to the shaft to axially retain the bearing element relative to the shaft. The retention assembly includes a cup installed to the shaft configured to axially abut the bearing element, and one or more external retaining rings installed to the shaft to axially retain the cup. One or more washers are installed radially between the cup and the one or more external retaining rings, and one or more internal retaining rings are installed to the cup to axially retain the one or more washers relative to the cup.

Additionally or alternatively, in this or other embodiments the cup includes a cup base configured to axially abut the bearing element, a cup body extending axially from the cup base, and a cup groove defined in the cup body. The one or more internal retaining rings are positioned in the cup groove.

Additionally or alternatively, in this or other embodiments a washer of the one or more washers includes a washer base installed to the shaft, and a washer body extending axially from the washer body to a position radially between an outer perimeter of the one or more external retaining rings and a radially inner surface of the cup defining a radial clearance between the washer body and the one or more external retaining rings.

Additionally or alternatively, in this or other embodiments the one or more washers is two washers, and a spring element is positioned axially between a first washer of the two washers and a second washer of the two washers to axially load the two washers.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
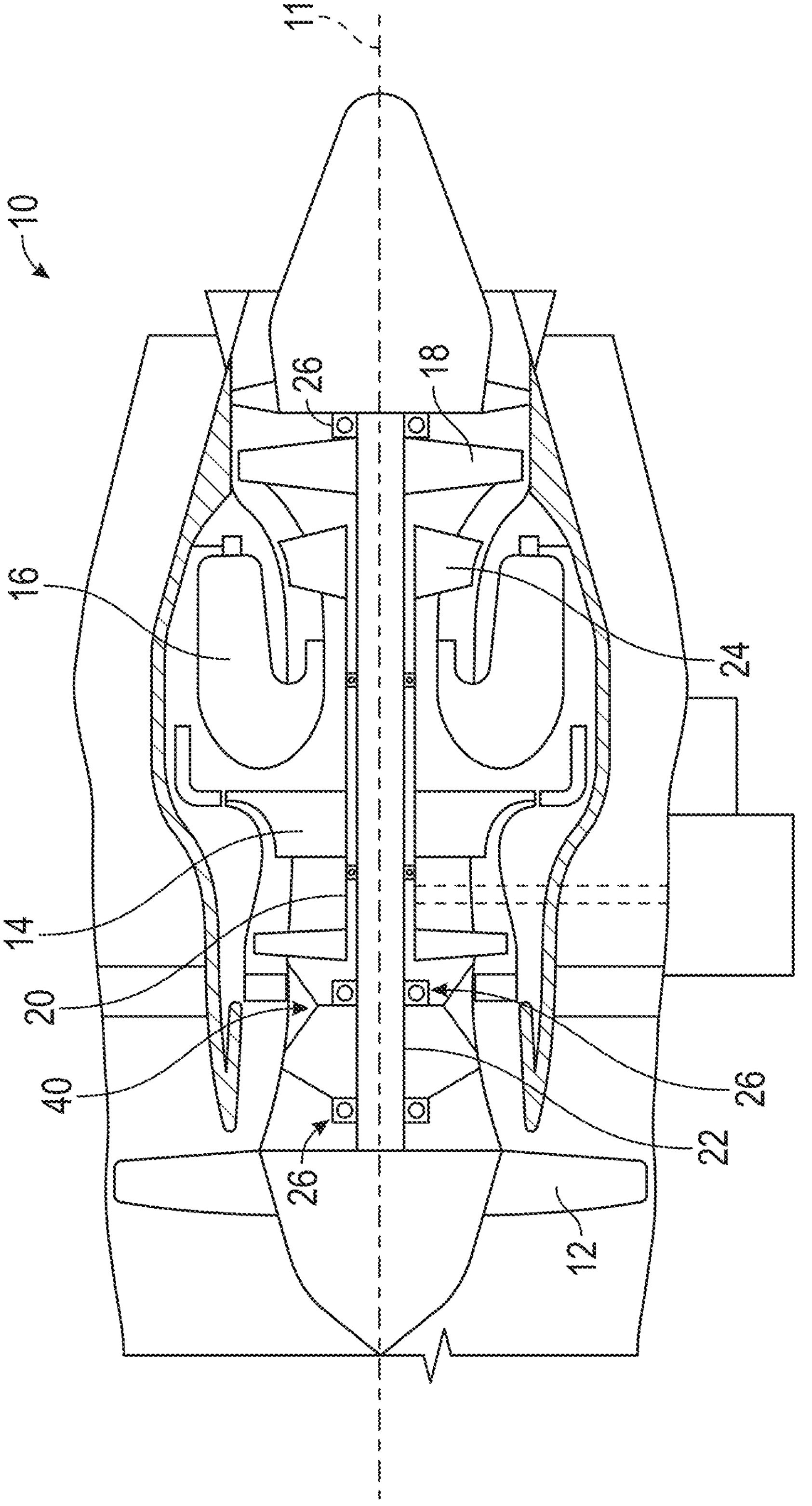
FIG. 1 is a cross-sectional view of an embodiment of a gas turbine engine.

FIG. 1 illustrates a turbofan gas turbine engine 10 of a type preferably provided for use in subsonic flight and generally comprising a low pressure spool assembly, which includes a fan assembly 12, a low pressure compressor assembly (not shown) and a low pressure turbine assembly 18 connected by a low pressure shaft 22, and a high pressure spool assembly, which includes a high pressure compressor assembly 14 and a high pressure turbine assembly 24 connected by a high pressure shaft 20. The engine 10 further comprises a combustor 16 in which compressed air from the high pressure compressor 14 is mixed with fuel and ignited for generating an annular stream of hot combustion gases from which the low pressure and high pressure turbine sections extract energy, as known in the art. The low pressure spool and the high pressure spool are rotatably supported by a number of axially spaced-apart bearings 26 concentrically mounted about the central axis 11 of the engine 10.

Figure 2:
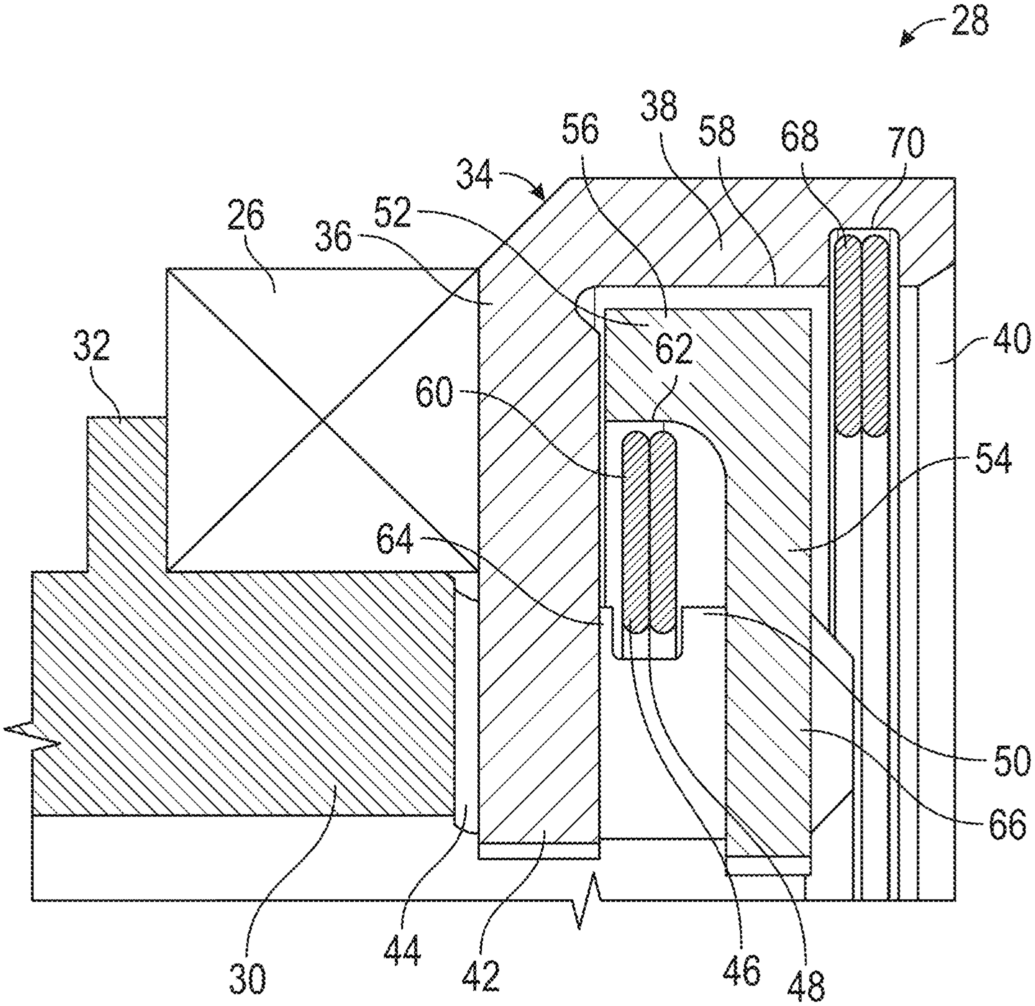
FIG. 2 is a partial cross-sectional view of an exemplary embodiment of a bearing and bearing retention assembly of a gas turbine engine.
Figure 3:
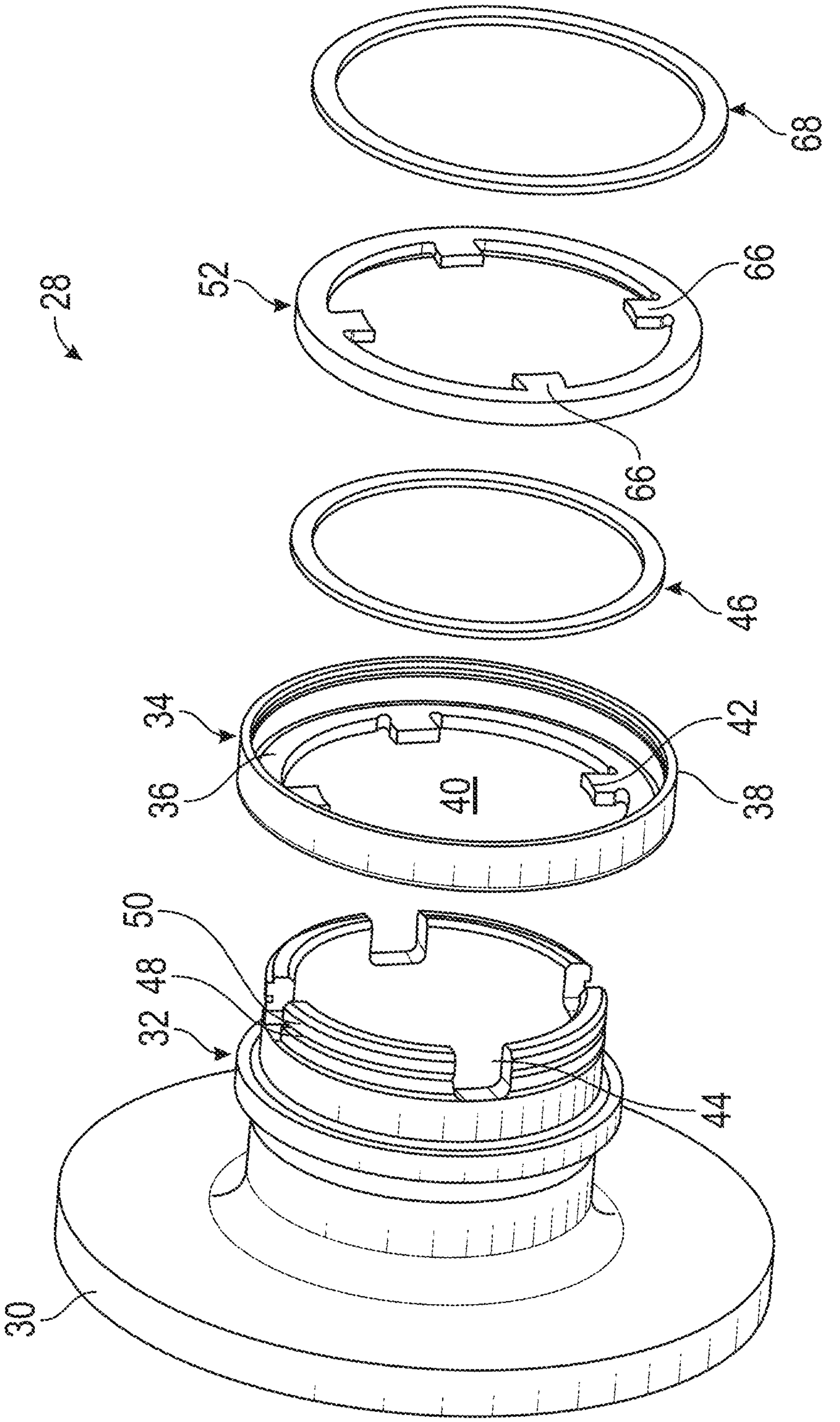
FIG. 3 is a partially disassembled view of an exemplary amendment of a bearing retention assembly.

Referring to the cross-sectional view of FIG. 2, and the partially disassembled view of FIG. 3, illustrated is an exemplary embodiment of a bearing 26, and bearing retention assembly 28. While the present embodiments are described in the context of a bearing and bearing retention, one skilled in the art will readily appreciate that the features of the present disclosure may be readily applied to other rotating assemblies, such as seals or the like. The bearing 26 is installed onto a shaft 30, for example, the low pressure shaft 22, which includes an axial bearing stop 32, which limits axial movement of the bearing 26 in a first direction. A cup 34 is installed onto the shaft 30 and is configured to axially retain the bearing 26 in a second direction opposite the first direction. The cup 34 includes a cup base 36 and a cup body 38 extending axially from the cup base 36 and together with the cup base 36 defining a cup interior 40. The cup base 36 includes one or more cup tabs 42 that are installed into corresponding shaft slots 44 in the shaft 30 to circumferentially locate and retain the cup 34 on the shaft 30.

The cup 34 is axially retained on the shaft 30 by one or more retaining rings 46 installed into a corresponding shaft groove 48 on an external shaft surface 50. These external retaining rings 46 are split in the circumferential direction as shown in FIG. 3 to allow the external retaining rings 46 to be opened for ease of installation into the shaft groove 48. While a spiral external retaining ring 46 is illustrated herein, one skilled in the art will readily appreciate that a split retaining ring, or other retaining ring configuration may be utilized.

A washer 52 is installed onto the external shaft surface 50 and is configured to radially retain the external retaining ring 46 in the shaft groove 48. The washer 52 includes a washer base 54 and a washer body 56 extending axially from the washer base 54 radially between a radially inboard surface 58 of the cup body 38 and an outer diameter 60 of the external retaining ring 46, defining a radial clearance 62 between the washer body 56 and the outer diameter 60. In some embodiments, a maximum radial clearance 62, when the external retaining ring 46 is fully seated in the shaft groove 48, is less than a groove depth 64 of the shaft groove 48. This ensures that, regardless of centrifugal growth of the external retaining ring 46, the external retaining ring 46 is always at least partially located in the shaft groove 48. In some embodiments, the washer base 54 includes one or more washer tabs 66 that are installed into the shaft slots 44 in the shaft 30 to circumferentially locate and retain the washer 52 on the shaft 30.

The washer 52 is axially retained on the shaft 30 by one or more internal retaining rings 68 installed into a cup groove 70 formed in the radially inboard surface 58 of the cup body 48. These internal retaining rings 68 are split in the circumferential direction as shown in FIG. 3 to allow the internal retaining rings 68 to be opened for ease of installation into the cup groove 70. While a spiral internal retaining ring 68 is illustrated herein, one skilled in the art will readily appreciate that a split retaining ring, or other retaining ring configuration may be utilized.

Figure 4:
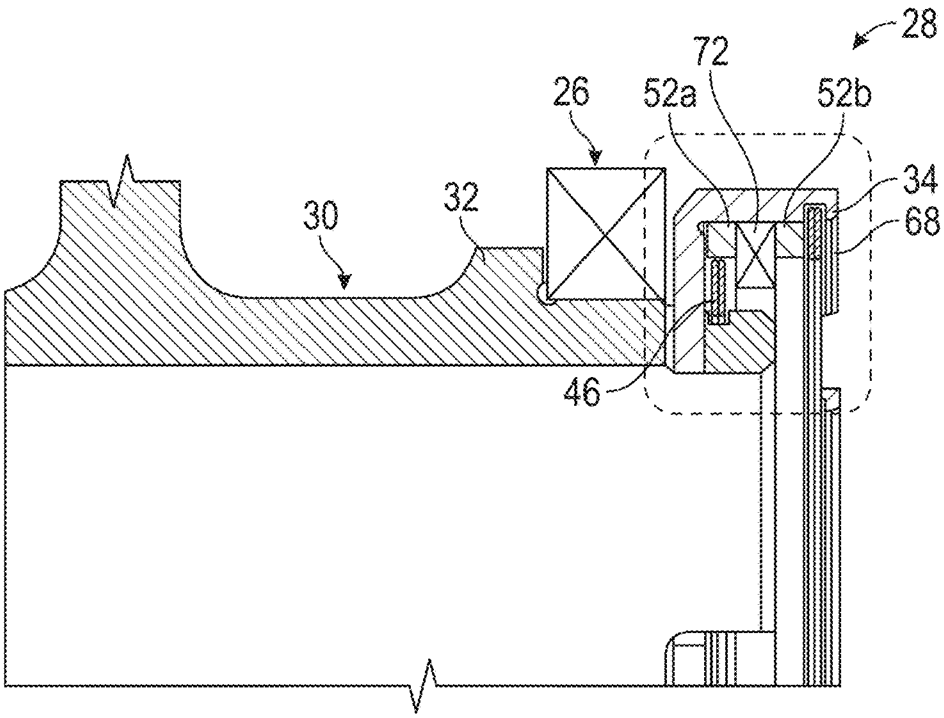
FIG. 4 is partial cross-sectional view of another exemplary embodiment of a bearing and bearing retention assembly of a gas turbine engine.
Figure 5:
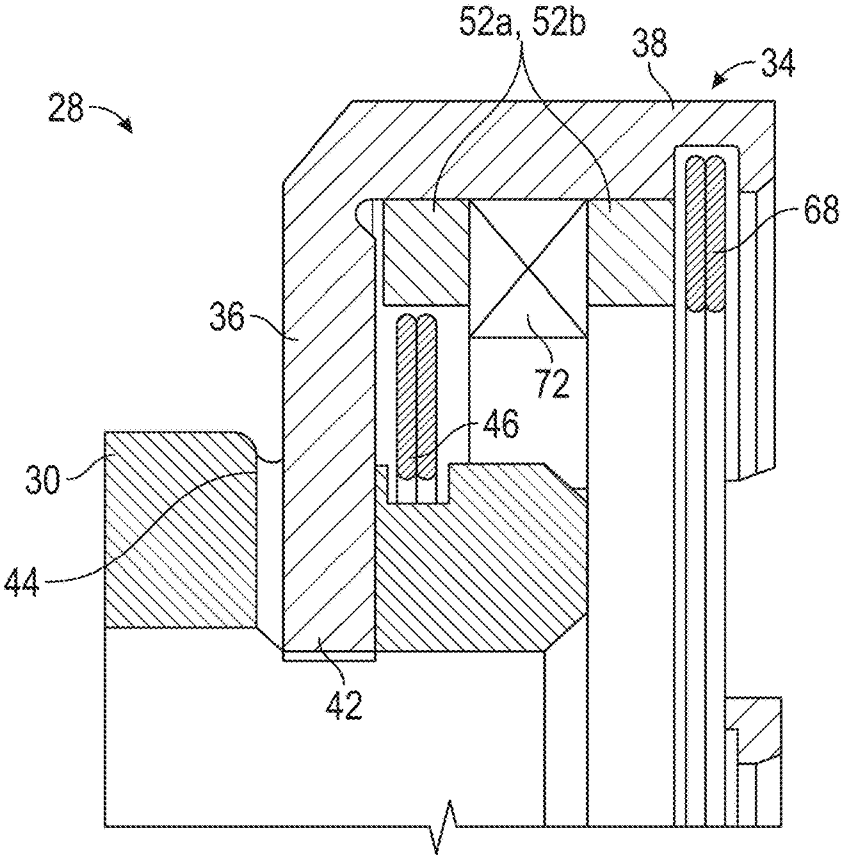
FIG. 5 is another cross-sectional view of the exemplary embodiment of FIG. 4.
Figure 6:
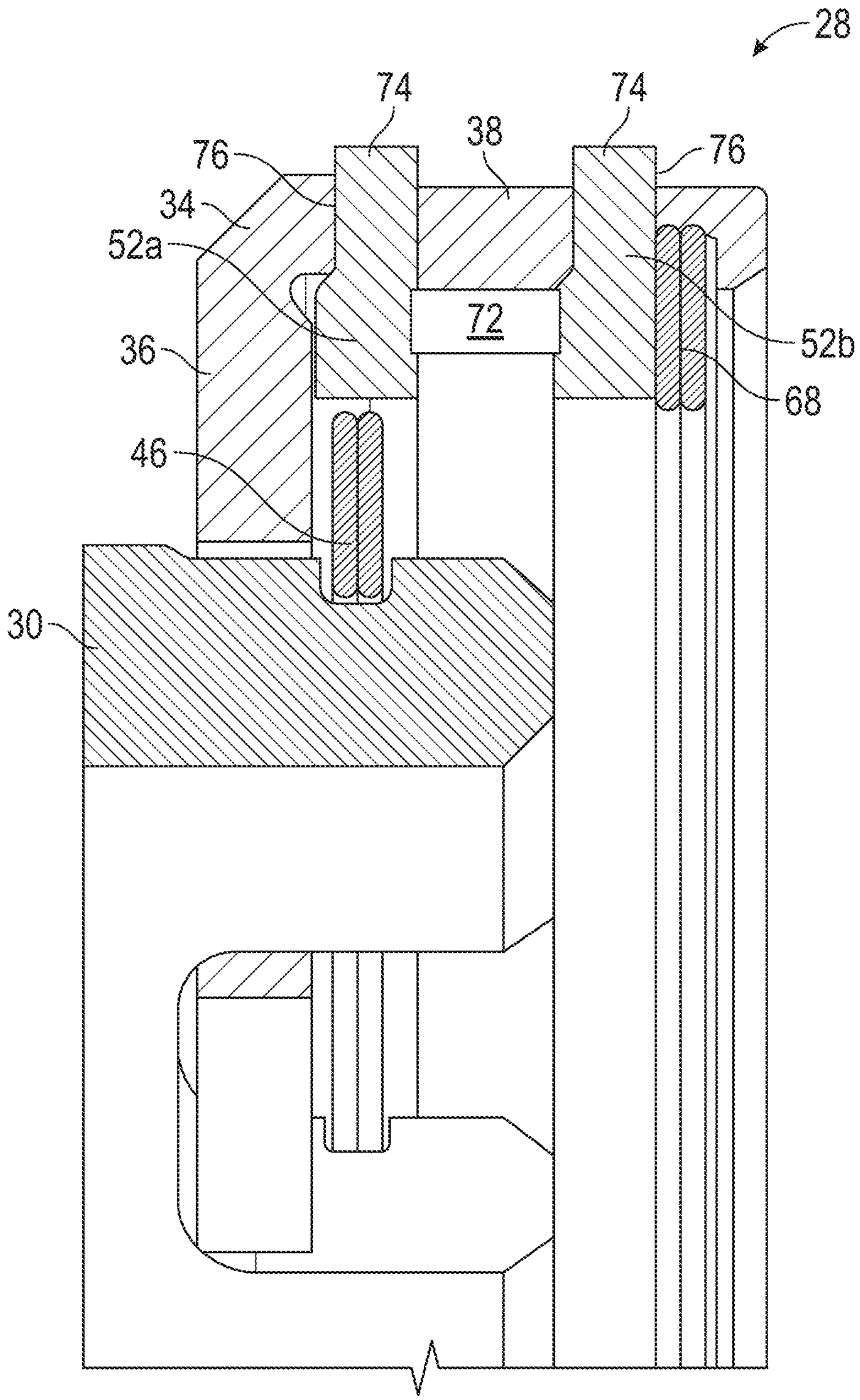
FIG. 6 is yet another cross-sectional view of the exemplary embodiment of FIG. 4.
Figure 7:
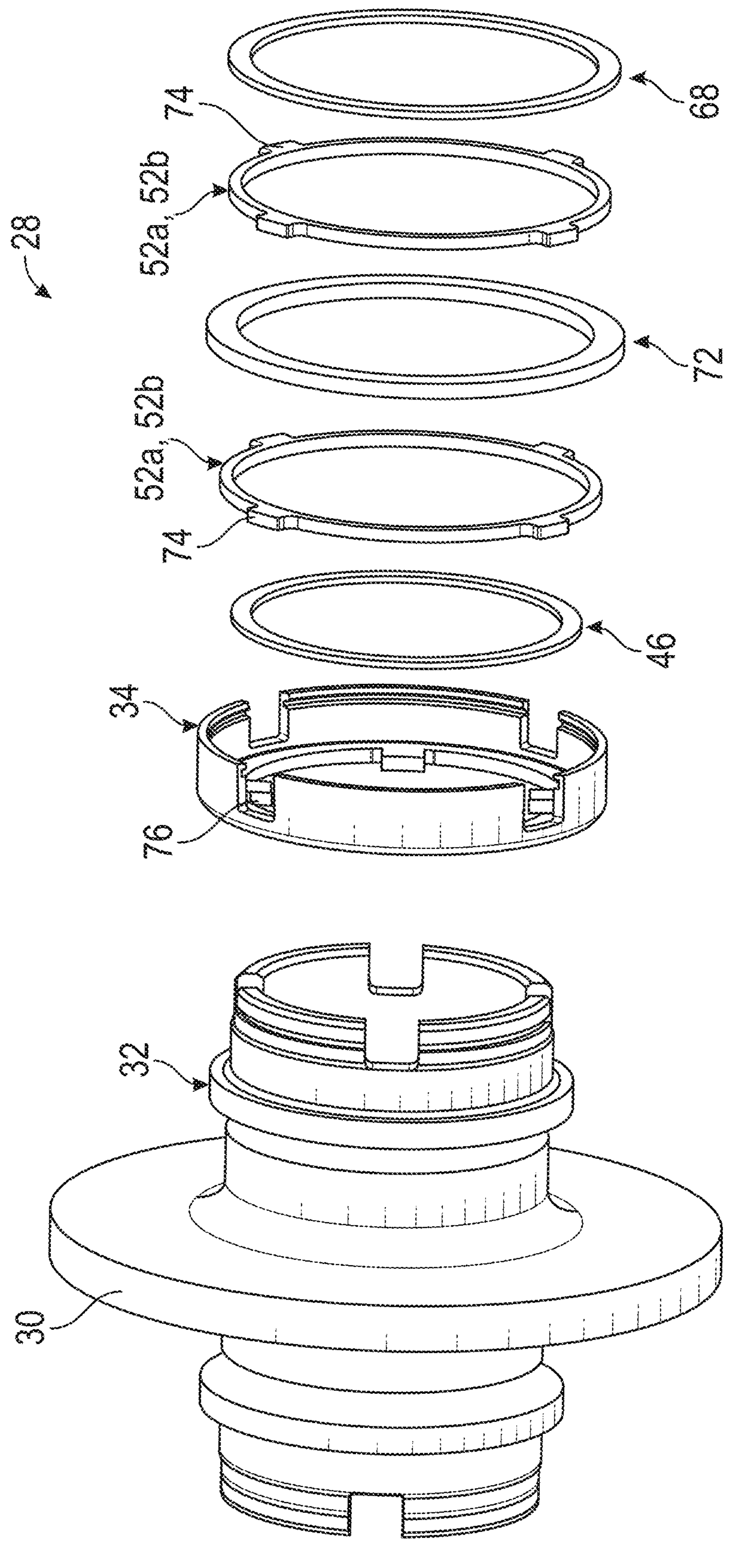
FIG. 7 is a partially disassembled view of the exemplary embodiment of FIG. 4.

Another exemplary embodiment of a bearing 26 and bearing retention assembly 28 is illustrated in FIGS. 4 and 5. This embodiment includes the cup 34 and the external retaining ring 46, and further includes two washers 52. A first washer 52*a* of the two washers is installed radially between the radially inboard surface 58 of the cup body 38 and the outer diameter 60 of the external retaining ring 46, defining the radial clearance 62. A second washer 52*b* is also installed into the cup interior 40 and configured to be positioned at the radially inboard surface 58 and a spring element 72 is located axially between the first washer 52*a* and the second washer 52*b*. The first washer 52*a*, the spring element 72 and the second washer 52*b* are retained in the cup 34 via the one or more internal retaining rings 68. The spring element 72 acts to load the washers 52*a* and 52*b* in the axial direction such that friction between the first washer 52*a* and the cup base 36 and between the second washer 52 and the internal retaining rings 68 is sufficient to prevent relative movement as the shaft 30 accelerates. Referring now to FIG. 6, the washers 52*a* and 52*b* each include anti-rotation lugs 74 extending radially outwardly into one or more locating openings 76 in the cup body 38 to circumferentially locate and retain the washers 52*a* and 52*b*, as also shown in the partially disassembled view of FIG. 7.

Figure 8:
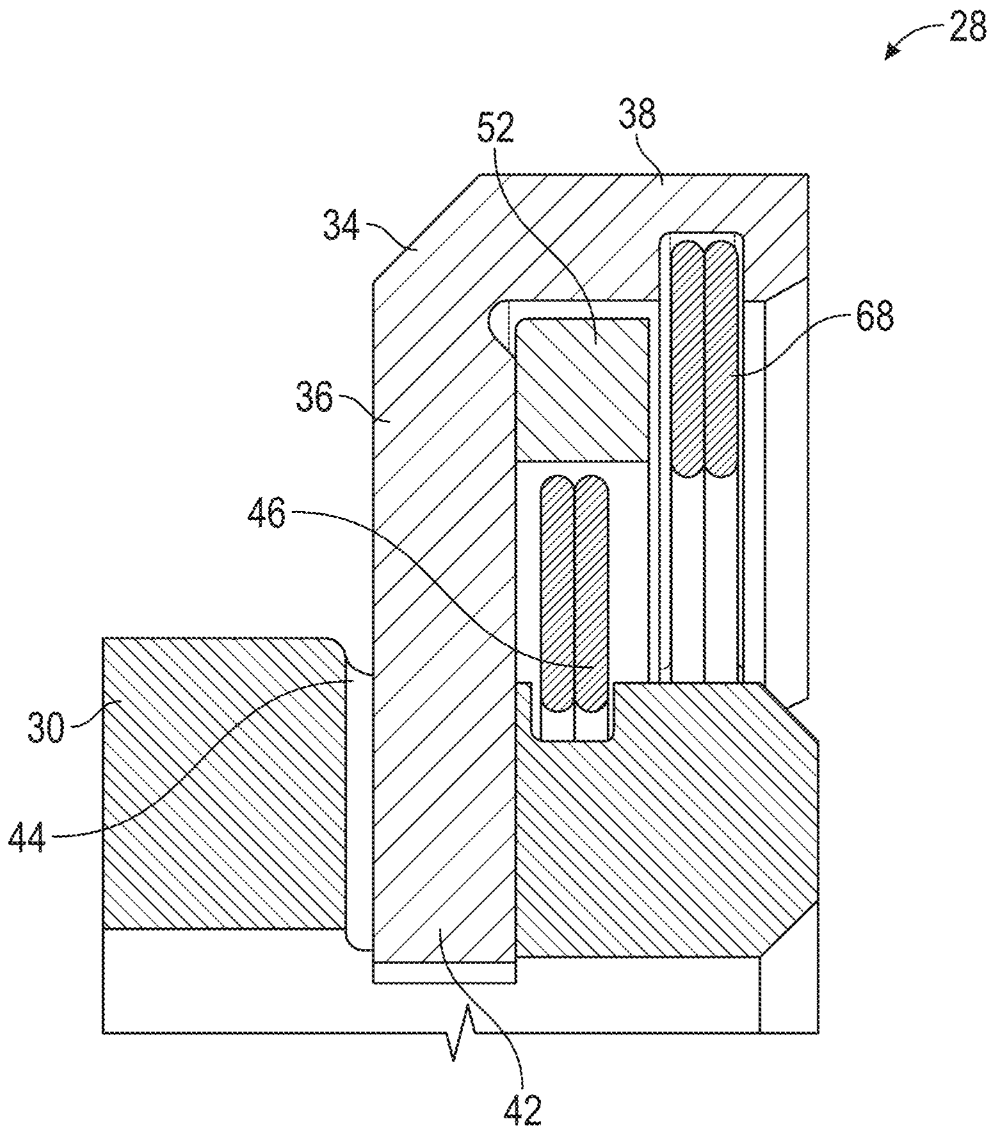
FIG. 8 is a partial cross-sectional view of yet another exemplary embodiment of a bearing and bearing retention assembly.

In another exemplary embodiment as illustrated in FIG. 8, a single washer 52 without a washer base 54 is utilized. In this embodiment, the washer 52 may also include the anti-rotation lugs 74 to circumferentially located the washer 52. Additionally, the spring element 72 is omitted, with the arrangement utilizing the internal retaining rings 68 to retain the washer 52 in position in the cup interior 40.

Figure 9:
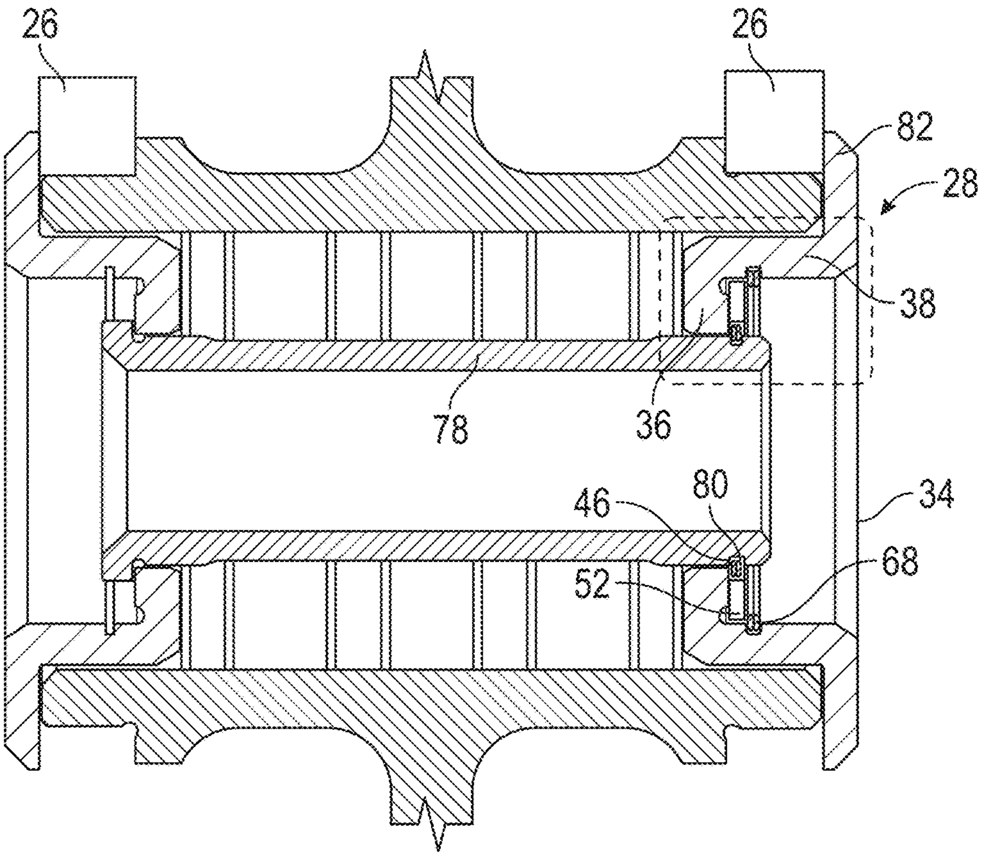
FIG. 9 is a partial cross-sectional view of still another exemplary embodiment of a bearing and bearing retention assembly.
Figure 10:
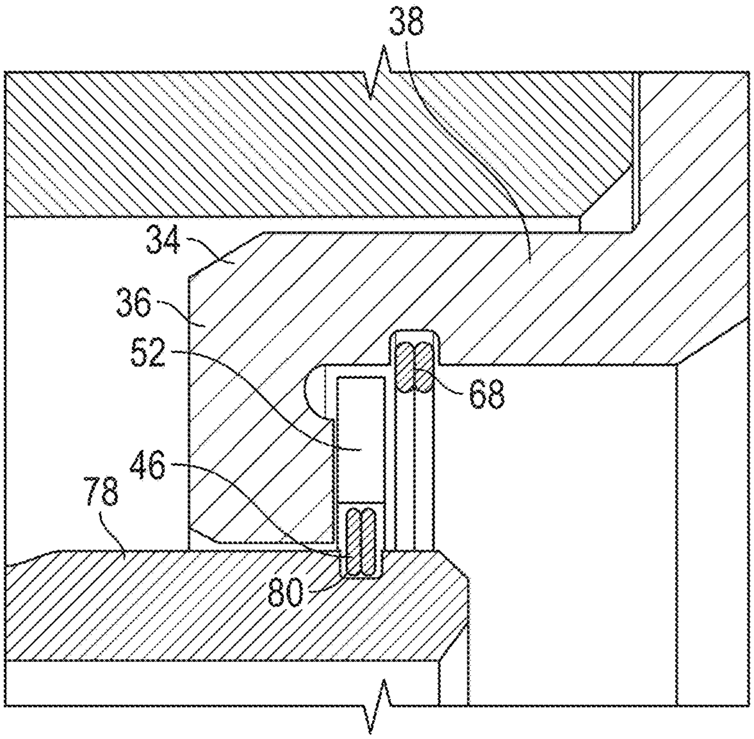
FIG. 10 is another partial cross-sectional view of the exemplary embodiment of FIG. 9.

In another exemplary embodiment illustrated in FIGS. 9 and 10, two cups 34 are installed into a shaft interior 76 to reduce an axial footprint of the bearing retention assembly 28. The cups 34 are installed to a shaft sleeve 78 utilizing one or more external retaining rings 46 installed to a corresponding sleeve groove 80 in the shaft sleeve 78. The external retaining rings 46 are retained in the sleeve groove 80 via the washer 52 and the one or more internal retaining rings 68. The bearing 26 is axially retained to the shaft 30 via a cup flange 82 protruding radially outwardly from the cup body 38. The embodiment could also feature the dog and slot 44/42 arrangement between the cup and the shaft (not shown).

The embodiments disclosed herein utilize external retaining rings 46 in the bearing retention assembly 28 for ease of installation and include the cup 34 and washer 52 arrangements to prevent unintentional disassembly of the external retention rings 46 during operation of the gas turbine engine 10.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotating component assembly of an aircraft gas turbine engine, comprising:
- a first rotating component;
- a second rotating component located at an external surface of the first rotating component; and
- a retention assembly configured to axially retain the second rotating component relative to the first rotating component, the retention assembly including:
  - a cup installed to the first rotating component configured to axially abut the second rotating component;
  - one or more external retaining rings installed to the first rotating component to axially retain the cup and the second rotating component;
  - one or more washers installed radially between the cup and the one or more external retaining rings; and
  - one or more internal retaining rings installed to the cup to axially retain the one or more washers relative to the cup.

2. The rotating component assembly of claim 1, wherein the one or more external retaining rings are engaged in a first rotating component groove of the first rotating component.

3. The rotating component assembly of claim 1, wherein the cup includes:
- a cup base configured to axially abut the second rotating component;
- a cup body extending axially from the cup base; and
- a cup groove defined in the cup body;
- wherein the one or more internal retaining rings are disposed in the cup groove.

4. The rotating component assembly of claim 3, further comprising:
- one or more cup tabs extending radially inwardly from the cup base; and
- one or more component slots defined in the first rotating component receptive of the one or more cup tabs.

5. The rotating component assembly of claim 1, wherein a washer of the one or more washers includes:
- a washer base installed to the first rotating component; and
- a washer body extending axially from the washer body to a position radially between an outer perimeter of the one or more external retaining rings and a radially inner surface of the cup defining a radial clearance between the washer body and the one or more external retaining rings.

6. The rotating component assembly of claim 5, wherein the clearance is defined to prevent disengagement of the one or more external retaining rings from the first rotating component.

7. The rotating component assembly of claim 1, wherein the one or more washers is two washers.

8. The rotating component assembly of claim 7, further comprising a spring element disposed axially between a first washer of the two washers and a second washer of the two washers.

9. The rotating component assembly of claim 1, wherein the one or more washers is two washers, and a spring element is disposed axially between a first washer of the two washers and a second washer of the two washers to axially load the two washers.

10. A shaft and bearing assembly of an aircraft gas turbine engine, comprising:
- a rotating shaft;
- a bearing element installed to an external surface of the shaft; and
- a retention assembly installed to the shaft to axially retain the bearing element relative to the shaft, the retention assembly including:
  - a cup installed to the shaft configured to axially abut the bearing element;
  - one or more external retaining rings installed to the shaft to axially retain the cup and the bearing;
  - one or more washers installed radially between the cup and the one or more external retaining rings; and
  - one or more internal retaining rings installed to the cup to axially retain the one or more washers relative to the cup.

11. The shaft and bearing assembly of claim 10, wherein the one or more external retaining rings are engaged in a shaft groove of the shaft.

12. The shaft and bearing assembly of claim 10, wherein the cup includes:
- a cup base configured to axially abut the bearing element;
- a cup body extending axially from the cup base; and
- a cup groove defined in the cup body;
- wherein the one or more internal retaining rings are disposed in the cup groove.

13. The shaft and bearing assembly of claim 12, further comprising:
- one or more cup tabs extending radially inwardly from the cup base; and
- one or more component slots defined in the shaft receptive of the one or more cup tabs.

14. The shaft and bearing assembly of claim 10, wherein a washer of the one or more washers includes:
- a washer base installed to the shaft; and
- a washer body extending axially from the washer body to a position radially between an outer perimeter of the one or more external retaining rings and a radially inner surface of the cup defining a radial clearance between the washer body and the one or more external retaining rings.

15. The shaft and bearing assembly of claim 14, wherein the clearance is defined to prevent disengagement of the one or more external retaining rings from the shaft.

16. The shaft and bearing assembly of claim 10, wherein the one or more washers is two washers.

17. The shaft and bearing assembly of claim 16, further comprising a spring element disposed axially between a first washer of the two washers and a second washer of the two washers.

18. A gas turbine engine of an aircraft, comprising:
- a combustor;
- a turbine driven about an engine central longitudinal by combustion products;
- a shaft driven about the engine central longitudinal axis by the turbine;
- a bearing element disposed at the shaft; and
- a retention assembly installed to the shaft to axially retain the bearing element relative to the shaft, the retention assembly including:
  - a cup installed to the shaft configured to axially abut the bearing element;
  - one or more external retaining rings installed to the shaft to axially retain the cup;
  - one or more washers installed radially between the cup and the one or more external retaining rings; and
  - one or more internal retaining rings installed to the cup to axially retain the one or more washers relative to the cup.

19. The gas turbine engine of claim 18, wherein the cup includes:
- a cup base configured to axially abut the bearing element;
- a cup body extending axially from the cup base; and
- a cup groove defined in the cup body;
- wherein the one or more internal retaining rings are disposed in the cup groove.

20. The gas turbine engine of claim 18, wherein a washer of the one or more washers includes:
- a washer base installed to the shaft; and
- a washer body extending axially from the washer body to a position radially between an outer perimeter of the one or more external retaining rings and a radially inner surface of the cup defining a radial clearance between the washer body and the one or more external retaining rings.

* * * * *